(12) United States Patent
Gaske et al.

(10) Patent No.: US 6,961,430 B1
(45) Date of Patent: Nov. 1, 2005

(54) METHOD AND APPARATUS FOR BACKGROUND CACHING OF ENCRYPTED PROGRAMMING DATA FOR LATER PLAYBACK

(75) Inventors: T. Paul Gaske, Rockville, MD (US); Walter R. Kepley, Gaithersburg, MD (US); Scott Casavant, Germantown, MD (US); Kuriacose Joseph, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 781 days.

(21) Appl. No.: 09/699,650

(22) Filed: Oct. 30, 2000

Related U.S. Application Data (60) Provisional application No. 60/164,687, filed on Nov. 10, 1999, provisional application No. 60/199,438, filed on Apr. 25, 2000.

(51) Int. Cl.[7] ............................................. H04N 5/455
(52) U.S. Cl. ..................... 380/216; 380/201; 725/46
(58) Field of Search ................................. 380/216, 201; 725/46

(56) References Cited

U.S. PATENT DOCUMENTS

| | | | |
|---|---|---|---|
| 4,855,730 A | 8/1989 | Venners et al. | |
| 5,404,505 A | 4/1995 | Levinson | 707/10 |
| 5,418,621 A | 5/1995 | Park | |
| 5,515,106 A | 5/1996 | Chaney et al. | 725/48 |
| 5,534,911 A | 7/1996 | Levitan | |
| 5,634,012 A | 5/1997 | Stefik et al. | 705/39 |
| 5,642,153 A | 6/1997 | Chaney et al. | |
| 5,710,970 A | 1/1998 | Walters et al. | 725/873 |
| 5,719,943 A | 2/1998 | Amda et al. | |
| 5,761,607 A | 6/1998 | Gudesen | 725/89 |
| 5,790,935 A | 8/1998 | Payton | |
| 5,805,763 A | 9/1998 | Lawler et al. | |
| 5,815,671 A | 9/1998 | Morrison | 725/35 |
| 5,841,979 A | 11/1998 | Schulhof et al. | 709/237 |
| 5,850,218 A * | 12/1998 | LaJoie et al. | 725/45 |
| 5,861,906 A | 1/1999 | Dunn et al. | |
| 5,867,207 A | 2/1999 | Chaney et al. | |
| 5,933,500 A * | 8/1999 | Blatter et al. | 380/200 |
| 6,005,561 A | 12/1999 | Hawkins et al. | 715/500.1 |
| 6,233,389 B1 * | 5/2001 | Barton et al. | 386/46 |
| 6,293,357 B1 | 9/2001 | Patterson | |
| 6,374,404 B1 * | 4/2002 | Brotz et al. | 725/46 |
| 6,424,947 B1 | 7/2002 | Tsuria et al. | 705/1 |
| 6,438,596 B1 | 8/2002 | Ueno et al. | 709/226 |
| 6,701,528 B1 | 3/2004 | Arsenault et al. | |
| 2002/0054752 A1 | 5/2002 | Wood et al. | 386/83 |

\* cited by examiner

*Primary Examiner*—Ayaz Sheikh
*Assistant Examiner*—Taghi Arani
(74) *Attorney, Agent, or Firm*—Georgann S. Grunebach (57) ABSTRACT

A method and apparatus for enabling background caching of encrypted programming data on a storage medium for later playback in a digital video recorder (DVR) system. A set-top box (STB) equipped with a DVR searches a program guide for upcoming pay-per-view (PPV) events. When the PPV event begins, the STB tunes an appropriate transponder and begins receiving programming data packets containing audio, video, system time and conditional access data packets associated with the event, which are stored for playback on a storage medium. When the user turns the STB on and selects an option to playback a previously-recorded PPV event, the appropriate programming data is retrieved from the storage medium, and the STB recreates the original transmission timing of the data, to be displayed on a display device of the user.

28 Claims, 8 Drawing Sheets

METHOD AND APPARATUS FOR BACKGROUND CACHING OF ENCRYPTED PROGRAMMING DATA FOR LATER PLAYBACK

RELATED APPLICATION(S)

This application claims the benefit under 35 U.S.C. Section 119(e) of a U.S. Provisional Patent Application by Paul Gaske et al. entitled "BACKGROUND CACHING OF ENCRYPTED PROGRAMMING DATA FOR LATER PLAYBACK". Ser. No. 60/164,687, filed on Nov. 10, 1999. Additionally, this application claims priority to a U.S. Provisional application by Adrian Yap et al. entitled "DIGITAL VIDEO RECORDER", Ser. No. 60/199,438, filed on Apr. 25, 2000, the entire contents of each application being incorporated by reference herein.

BACKGROUND OF THE INVENTION

1. Technical Field of the Invention

This invention generally relates to digital recording, playing, and playback of previously recorded audiovisual (A/V) signals. This invention more particularly relates to a method and apparatus for receiving broadcast entertainment-type data, such as packetized digital video, audio, conditional access, and system time signals transmitted in a direct broadcast satellite or digital video broadcast (DVB) system, and for storing the received data in an encrypted format, until viewing is desired by the user.

2. Description of Related Art

Conventional communications systems include a receiver for receiving and processing transmitted waveforms. One type of receiver is part of a "wireless digital television." Wireless Digital Television allows consumers to receive, directly in their homes, numerous channels broadcast from a set of satellites. The receiver includes a small satellite dish connected by a cable to a set-top box (STB) or an integrated receiver-decoder (IRD), which are used as interchangeable terms in the art. The satellite dish is aimed toward the satellites, and the STB is connected to the user's television in a similar fashion to a conventional cable-TV decoder.

On the transmission side, video, audio, and related information data signals are digitally encoded into a packetized data stream using a number of algorithms. The encoded data stream, which includes overhead for error correction, is modulated to Ku-band frequency, transmitted to the satellite, and relayed from the satellite to the satellite dish. The satellite dish shifts the Ku-band signal down to an L-band signal that is transmitted through the cable to the STB.

In the STB, front-end circuitry receives the L-band signal and converts it to the original digital data stream of video, audio, and related information signals. The digital data stream is fed to video/audio decoder circuits that perform the main video/audio processing functions such as de-multiplexing and decompression. A micro-controller controls the overall operation of the STB, including the selection of parameters, the set-up and control of components, channel selection, viewer access to different programming packages, blocking certain channels, and many other functions. The compression and decompression of packetized video signals may be accomplished according to the Motion Picture Expert Group (MPEG) standards and the compression and decompression of audio signals may be accomplished according to the Motion Picture Expert Group (MPEG) standards or the Dolby™ Digital (or AC-3) standard. Thus, the STB unit typically includes an MPEG-1 or MPEG-2 video decoder and an MPEG-1, MPEG-2, or Dolby™ Digital (or AC-3) audio decoder in order to decompress the received compressed video and audio. The video and audio decoders can be on the same or separate chips.

A transport processor of the STB outputs video and audio data to a number of destinations, including audio and video decoders, ports, memories, and interface devices, such as a digital VHS (DVHS) interface. The STB may send the same audio and video data to different destinations.

Using a conventional STB, when a user wishes to view a pay-per-view (PPV) event, the user (1) must decide in a relatively short period of time (one half-hour or less) whether the user wants to view the PPV event; (2) must be available to view the PPV event when the programming is shown; (3) must wait, usually until the next half-hour boundary, for the PPV event to begin; and (4) must watch the PPV event in real time. These time constraints unnecessarily burden the potential viewer of a PPV event.

SUMMARY OF THE INVENTION

The present invention is directed to a method and apparatus for background caching of encrypted programming for later playback. When a PPV event is selected for caching, the digital data packets are stored for later decryption and playback. The digital data may include audio and video digital packets, system time, and conditional access packets. In one embodiment, storing and playback of digital data is performed automatically without user intervention by a set-top box (STB), with playback being performed when the user pays for a desired one, or plurality of, PPV events. Programming materials may be protected by encryption within the STB. Programming may also be protected by an additional level of conditional access/copy protection provided within the STB. The PPV events that are stored may be one or more events selected by a user, or all PPV events available to a user.

As set forth above, all PPV events are stored in encrypted format. The PPV events are not decrypted until the user determines which of the PPV events he/she would like to view. At that time, the data packets for the selected PPV event are decrypted and the user is billed for the PPV event. As a result, the user is not billed for all PPV events recorded, only the PPV events that are subsequently replayed.

The present invention is embodied in a wireless distribution system that conveniently distributes digital packetized video, audio, and data to individual users at geographically remote locations.

At a satellite uplink facility, video and audio signals may be digitized in a known manners, multiplexed with other data signals, compressed (if required), combined with error correction codes, encrypted, modulated on a carrier, and uplinked to a geo-synchronous satellite. The satellite receives the uplinked signals and rebroadcasts them over a footprint that preferably covers at least the continental United States. Receiver units, which are typically located at the user's dwelling, receive the satellite signals. The receiver units include an antenna, which preferably is in the form of a satellite dish, along with an STB. The antenna feeds the received satellite signal to the STB unit, which receives the transmitted digital video, audio, and data.

Typically, the received packets are presented to a transport circuit that is in communication with a microprocessor. The microprocessor informs the transport circuit which packets are of interest.

For example, if the STB is instructed by the user to display a PPV event, the microprocessor instructs the transport to receive and process all packets (including particularly the video and audio packets) associated with the PPV event programming. The information about how to receive the PPV event, or any other programming channel, may be provided via a program guide data stream accessed by the microprocessor of the STB.

In general, the program guide identifies (based on header information) those packets that must be assembled in order to construct the audio and video for any of the available programs. Program guide data also may include information needed to construct a graphical listing of the show times and channels for available programming, program description data, program rating data, program category data, and other data. A transport processor can identify the desired PPV event packets by header information in the packet, strip off the payload portion of the packet, and forward the payloads to an audio and video decoder (or optionally first to an intermediate storage location). The audio and video decoders can be on the same or separate chips. The decoder then stores the payloads in designated memory locations. The PPV event video and audio payloads are then called up from their memory locations as needed, decoded, converted to NTSC analog signals, and provided to a conventional display device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

The present invention may be embodied in a satellite-based distribution system. The system generally includes an earth station that compiles a number of programs (video and audio) into a broadband signal, modulates a carrier frequency band with the broadband signal and then transmits (uplinks) the modulated signal to a geosynchronous satellite via a transmit antenna. The satellite amplifies the received signal, shifts the signal to a different carrier frequency band and transmits (downlinks) the frequency shifted signal to earth for reception at individual receiver stations.

The uplink and downlink broadband signals of the disclosed satellite distribution system may be divided into a plurality of transponder signals, each having a plurality of individual channels. For example, analog satellite systems operating in the so-called "G-band," i.e., between about 3.7 GHz and about 4.2 GHz, typically broadcast ten (10)–500 MHz-wide transponder signals, with each transponder signal further including twelve, 40 MHz- wide analog channels. Satellite systems may also broadcast a set of transponder signals at multiple polarizations, for example, a right-hand circular polarization (PHCP) and a left-hand circular polarization (LHCP), within the band of carrier frequencies associated with the satellite; effectively doubling the number of channels broadcast by the system.

Satellite-based signal distribution systems exist for many frequency bands, including the so-called "Ku-band" which ranges from approximately 12 GHz- to approximately 18 GHz. The preferred embodiment of the present invention uses an uplink signal having 16 RHCP transponder signals and 16 LHCP transponder signals modulated into the frequency band between about 17.2 GHz and about 17.7 GHz. Each of these 32 transponder signals includes data packets related to approximately 10 individual television channels associated therewith. The satellites shift the uplink transponder signals to carrier frequencies ranging from approximately 11.7 GHz to approximately 12.2 GHz and transmit these frequency-shifted transponder signals back to earth for reception at each of a plurality of individual receiver stations.

Each receiver station may include an antenna coupled to a set top box (STB) that is equipped with a digital video recorder (DVR). In another embodiment, the STB may have interface circuitry coupled thereto for connection to an external digital peripheral unit such as a storage medium.

The antenna may comprise a parabolic dish antenna such as an outdoor unit (ODU) for example, pointed in the general direction of the transmitting satellite (or other transmitting location) to thereby receive the broadband signal. Such antennas may also include a low-noise block (LNB) downconverter, which filters and shifts the incoming signal to an intermediate frequency band, such as L-band, which is between approximately 1.0 GHz and approximately 2.0 GHz. In one embodiment, the signal received from the satellite is shifted to the frequency band between approximately 950 MHz and approximately 1450 MHz.

Sometimes, only the RHCP transponder signals or the LHCP transponder signals are mixed down to L-band, depending on which channel a user is viewing. However, in systems having a two-channel LNB downconverter, both the RHCP and the LHCP transponder signals are shifted down to L-band and provided, via separate lines, to the receiver station.

Figure 1:
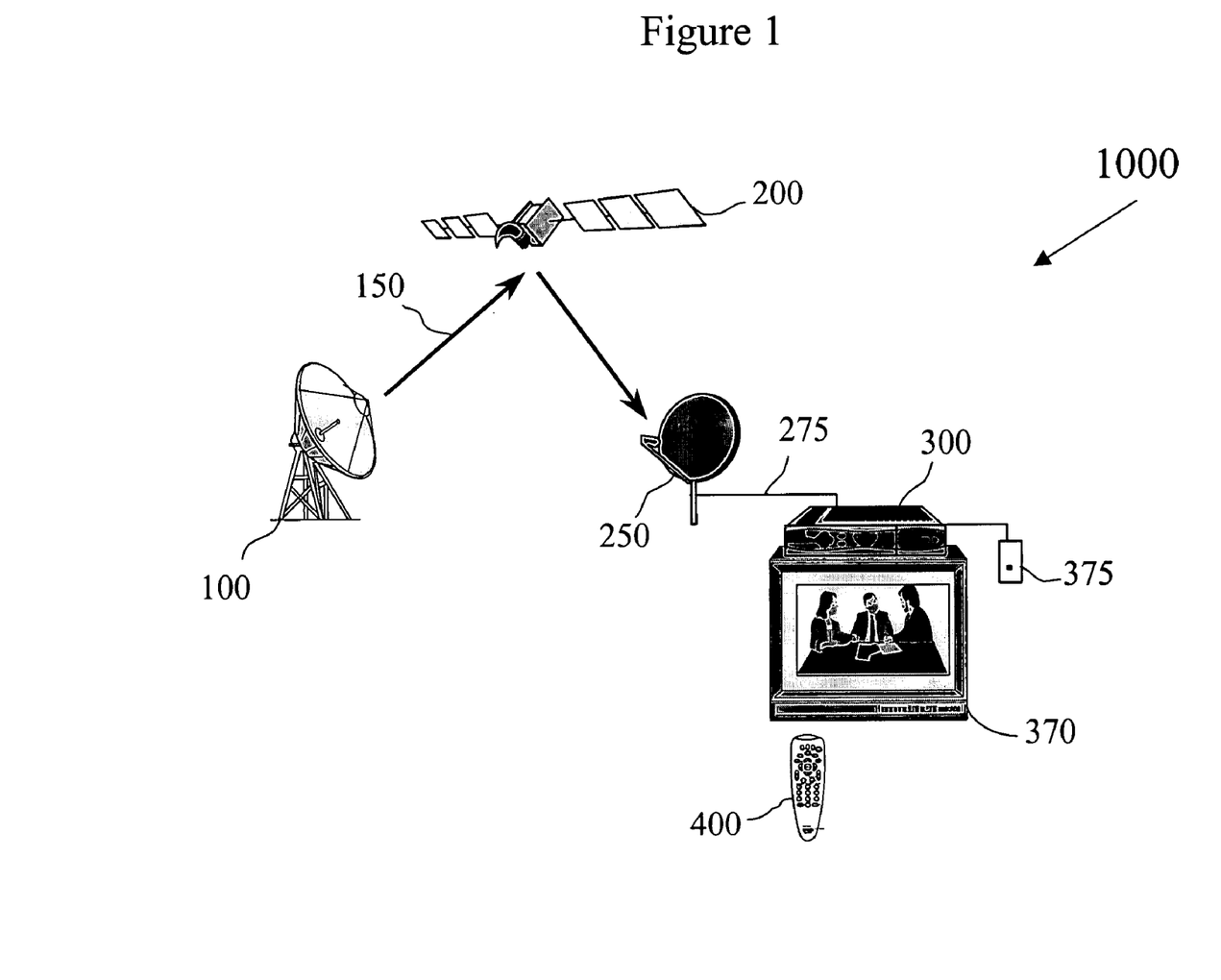
FIG. 1 is an exemplary arrangement of a digital video recorder-equipped (DVR) set-top box (STB) of a direct broadcast satellite or digital video broadcast system.

FIG. 1 is an exemplary arrangement of a set-top box (STB) 300 equipped with a digital video recorder (DVR) within a direct broadcast satellite or digital video broadcast (DVB) system, in accordance with the method and apparatus of the present invention. In the exemplary embodiment of FIG. 1, the system 1000 may comprise a transmit antenna station 100, satellite 200, receive antenna 250 and DVR 300.

The transmit antenna station may be a DVB system satellite uplink facility, for example, or any other earth station as described above and which is well known in the art. The bitstream 150 is a digital audio and video television data (A/V signal), the medium is a satellite 200, and the receive antenna 250 is preferably an outdoor unit (ODU). As illustrated in FIG. 1, the ODU is connected to a set-top box (hereinafter STB) 300 via coaxial cable 275. In this exemplary embodiment, the DVR of the present invention is included in, or subsumed within the STB 300. STB 300 may further be connected to a display 370, such as a standard definition television, a high definition television or a PC monitor and also may be connected to a telephone line 375. The DVR-equipped STB 300 may be controlled via a remote control 400.

Figure 2:
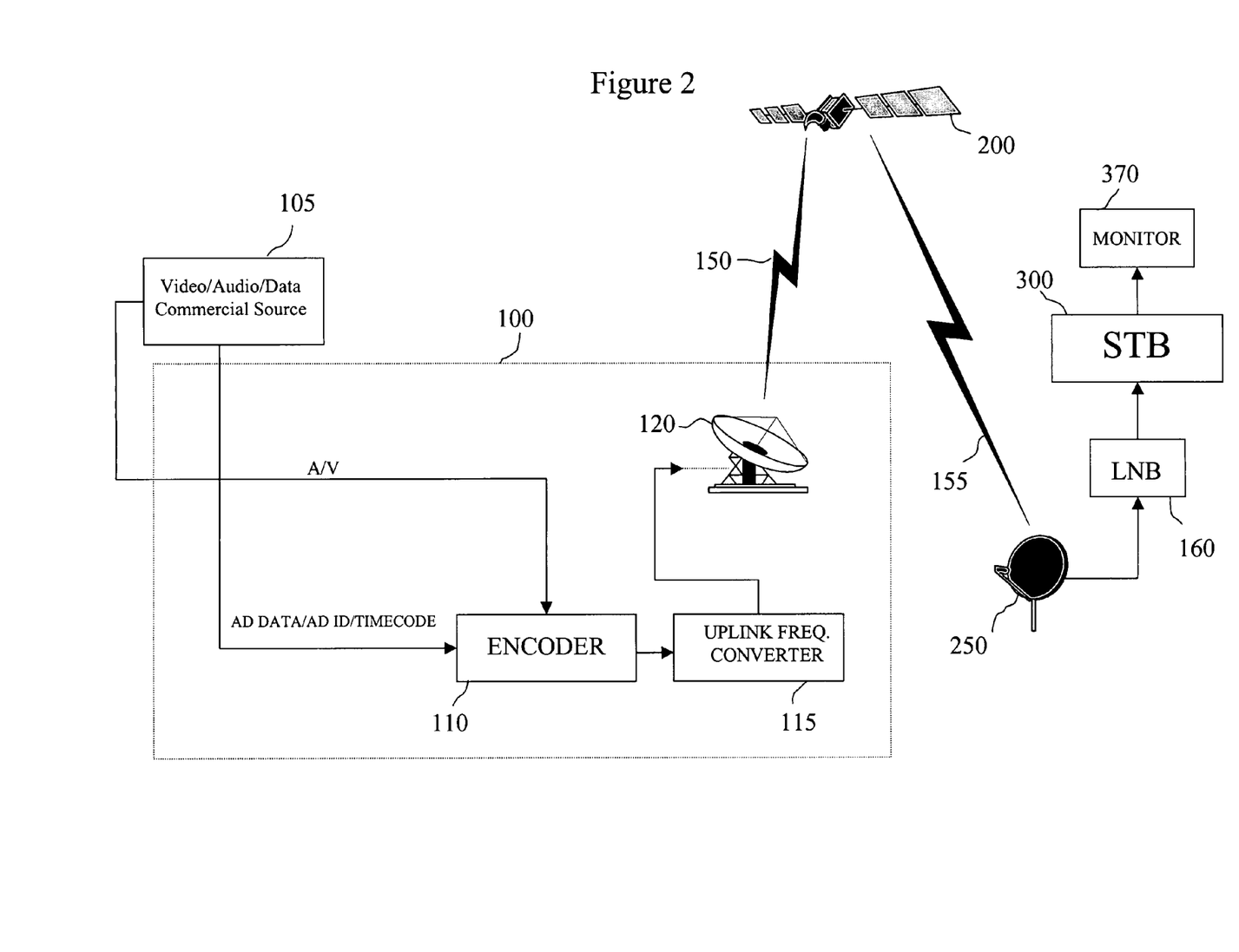
FIG. 2 illustrates a general data flow in a direct broadcast satellite or digital video broadcast system.

FIG. 2 illustrates the general data flow in a direct broadcast satellite or digital video broadcast system. In operation, the transmit antenna station 100 (hereinafter referred to as uplink facility 100 for clarity) can receive video and audio programming from a number of sources, including satellites, terrestrial fiber optics, cable, or tape. Preferably, the received programming signals, along with data signals such as electronic scheduling data and conditional access data, are sent from some commercial source 105 to a video/audio/data encoding system 110 within uplink facility 100. Here, they are digitally encoded and multiplexed into a packetized data stream using a number of conventional algorithms, including convolution error correction and compression, for example.

In a conventional manner, the encoded data stream is modulated and sent through an uplink frequency converter 115 which converts the modulated encoded data stream to a frequency band suitable for reception by the satellite 200. Preferably, the satellite frequency is K-band such as in the Ku-band; however the frequency may be in the Ka band as well. The modulated, encoded data stream is then routed from the uplink frequency converter 115 to an uplink satellite antenna/dish 120, where it is broadcast toward the satellite 200 over the airlink 150. The satellite 200 receives the modulated, encoded Ku-band data stream via downlink 155, and re-broadcasts it downward toward an area on earth that includes the various receiver stations (STB 300, for example). In this embodiment, the satellite dish (ODU 250) of STB 300 shifts the Ku-band signal down to an L-band signal which is transmitted via a LNB downconverter 160 to STB 300, for eventual reproduction on display monitor 370.

Front-end circuitry, which may or may not be part of STB 300, receives the L-band RF signals from the LNB 160 and converts them back into the original digital data stream. The front-end circuitry may include a tuner. Circuitry (shown and explained in more detail in FIG. 3) receives the original data streams via an input port and performs video/audio processing operations such as de-multiplexing and decompression. A microprocessor (host processor) controls the overall operation of STB 300, including the selection of parameters, the set-up and control of components, channel selection, a user's access to different program packages, and many other functions.

Figure 3:
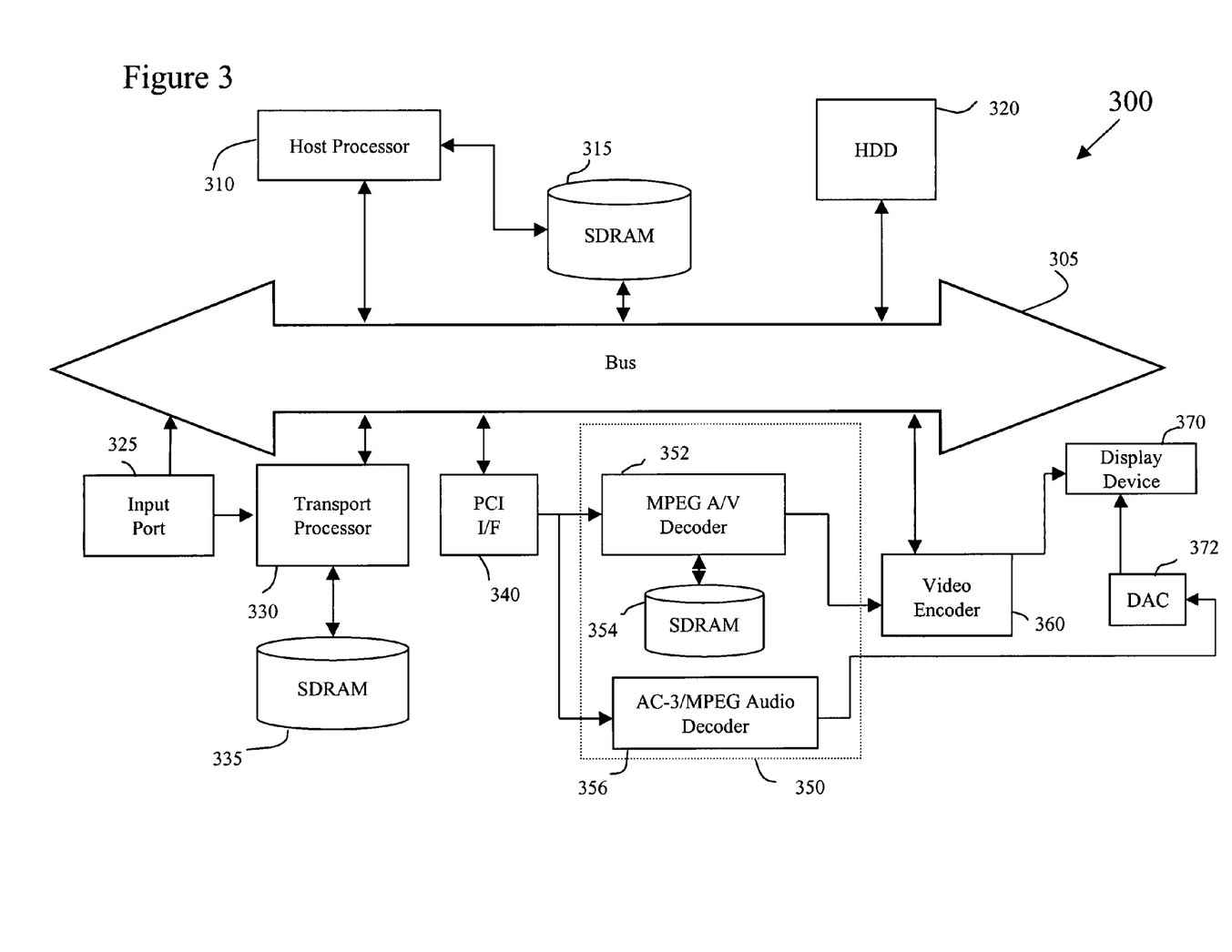
FIG. 3 is a block diagram of an exemplary architecture of the DVR-equipped STB that is capable of performing background caching of encrypted programming for later playback in accordance with the present invention.

FIG. 3 illustrates an exemplary architecture of the DVR-equipped STB 300 that is capable of performing background caching of encrypted programming for later playback in accordance with the present invention. The STB 300 utilizes a bus 305 to interconnect various components and to provide a pathway for data and control signals.

FIG. 3 illustrates a host processor 310, a memory device 315 (in an exemplary configuration embodied as an SDRAM 315) and a hard disc drive (HDD) 320 connected to the bus 305. The host processor 310 may also have a direct connection to SDRAM 315 as shown in FIG. 3.

As further shown in FIG. 3, a transport processor 330 and PCI I/F 340 (peripheral component interconnect interface) are connected to the bus 305. The transport processor 330 also has a connection to input port 325 and SDRAM 335. Furthermore, the PCI I/F 340 is connected to a decoder 350. The decoder 350 is connected to a video encoder 360. The output of video encoder 360 is in turn sent to a display device 370. Decoder 350 may include both an MPEG A/V decoder 352 and an AC-3/MPEG audio decoder 356, the output of the latter being sent to display device 370 after conversion in a digital-to-analog converter (DAC) 372.

The host processor 310 may be constructed with conventional microprocessors. Host processor 310 performs non real-time functions in the STB 300, such as graphics-user interface and browser functions.

HDD 320 is actually a specific example of a mass storage device. In other words, the HDD 320 may be replaced with other mass storage devices as is generally known in the art, such as known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause applications in STB 300.

The bus 305 may be implemented with conventional bus architectures such as a peripheral component interconnect (PCI) bus that is standard in many computer architectures. Alternative bus architectures could, of course, be utilized to implement bus 305.

The transport processor 330 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 3 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

The input port 325 receives audiovisual bitstreams that may include, for example, MPEG-1 and MPEG-2 video bitstreams, MPEG-1 layer II audio bitstreams and Dolby digital (AC-3) audio bitstreams. Exemplary A/V bitrates may range from about 60 Kbps to 15 Mbps for MPEG video, from about 56–384 Kbps for MPEG audio, and between about 32–448 Kbps for AC-3 audio. The single-stream maximum bitrate for STB 300 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 448 kbps.

Of course, various other audiovisual bitstream formats and encodation techniques may be utilized in recording. For example, STB 300 may record an AC-3 bitstream, if AC-3 broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform decryption. Moreover, the decryption may be performed instead by the host processor 310.

Alternatively, the host processor 310 and transport processor 330 may be integrated or otherwise replaced with a single processor. As mentioned above, the SDRAMs (315 and 335) may be consolidated or replaced with a single SDRAM or single memory device.

The PCI I/F 340 may be constructed with an ASIC that controls data reads from memory. Audiovisual (A/V) data may be sent to the host processor 310's memory while simultaneously being sent to an MPEG A/V decoder 352, as further discussed below.

As previously noted, decoder 350 may be constructed as shown in FIG. 3 by including the MPEG A/V decoder 352 connected to the PCI I/F 340, as well as an AC-3/MPEG audio decoder 356 which is also connected to the PCI I/F 340. In this way, the video and audio bitstreams from the PCI I/F 340 can be separately decoded by decoders 352 and 356, respectively. Alternatively, a consolidated decoder may be utilized that decodes both video and audio bitstreams together. As mentioned above, the encodation techniques are not limited to MPEG and AC-3 and can include any known or future developed encodation technique. In a corresponding manner, the decoder 350 could be constructed to process the selected encodation technique(s) utilized by the particular implementation desired.

In order to more efficiently decode the MPEG bitstream, the MPEG A/V decoder 352 may also include a memory device such as SDRAM 354 connected thereto. This SDRAM 354 may be eliminated, consolidated with decoder 352 or consolidated with the other SDRAMs 315 and/or 335.

Video encoder 360 is preferably an NTSC encoder that encodes, or converts the digital video output from decoder 350 into a coded analog signal for display. Regarding the specifications of the NTSC (National Television Standards Committee) encoder 360, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. SECAM uses the same bandwidth as PAL but transmits the color information sequentially. SECAM runs on 625 lines/frame.

Thus, although use of NTSC encoder 360 is envisioned to encode the processed video for display on display device 370, the present invention is not limited to this standard encoder. PAL and SECAM encoders may also be utilized. Further, hi-definition television (HDTV) encoders may also be viable to encode the processed video for display on a HDTV, for example.

Display device 370 may be an analog or digital output device capable of handling a digital, decoded output from the video encoder 360. If analog output device(s) are desired, to listen to the output of the AC-3/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices which are known and used in the art. If the output of the AC-3/MPEG audio decoder 356 is to be decoded by an external audio component, a digital audio output interface (not shown) may be included between the AC-3/MPEG audio decoder 356 and display device 370. The interface may be a standard interface known in the art such as a SPDIF audio output interface, for example, and may be used with, or in place of DAC 372, depending on whether the output devices are analog and/or digital display devices.

Figure 4:
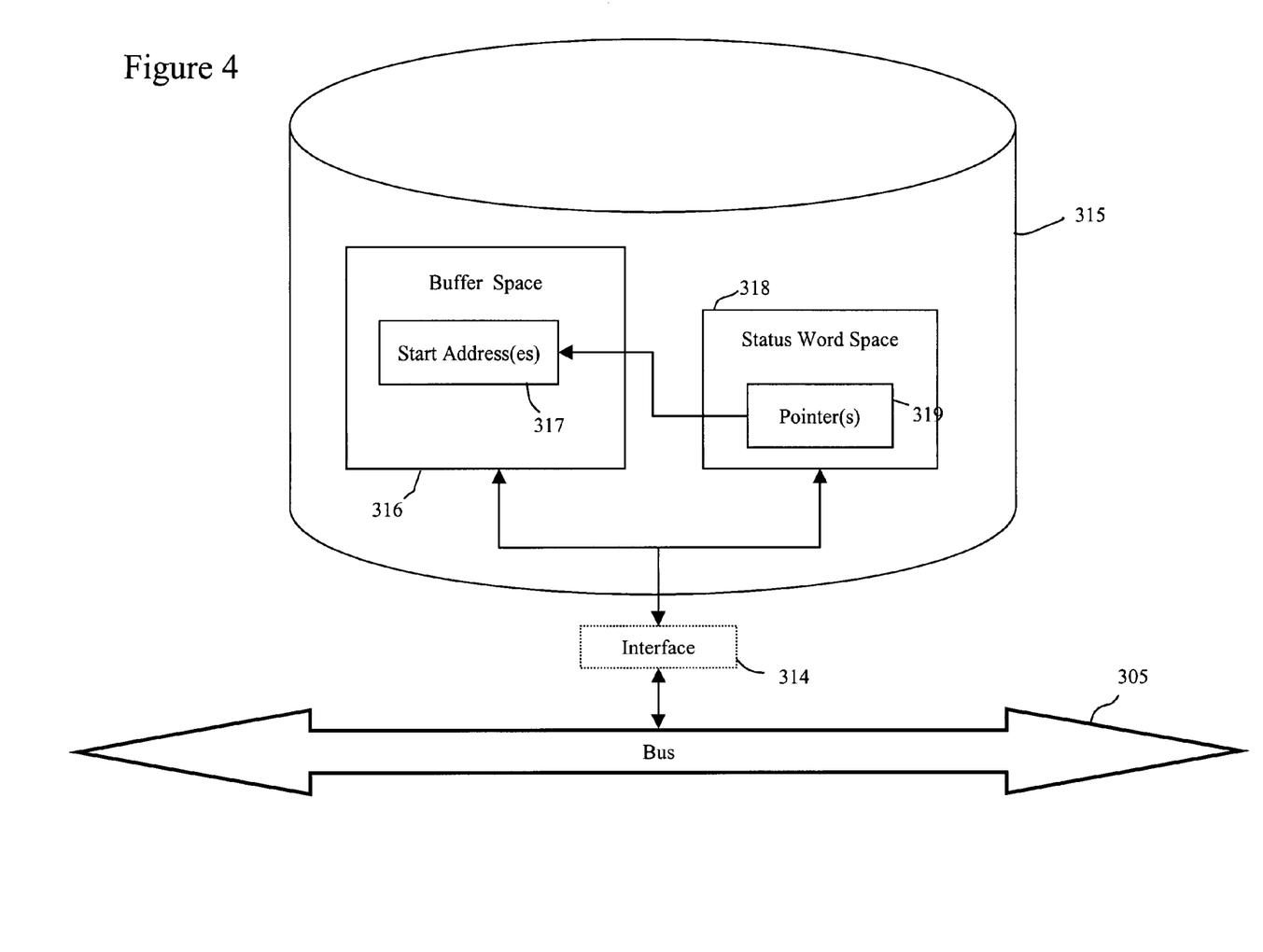
FIG. 4 is a block diagram showing an exemplary construction of a memory device according to an exemplary embodiment of the invention.

FIG. 4 illustrates various components that may be provided for the SDRAM 315. As mentioned above, the SDRAM shown in FIG. 3 is actually a specific implementation of a memory device. It is noted that the invention is not limited to this specific implementation of SDRAM 315 and can include any other known or future developed memory technology. Regardless of the technology selected, the memory device 315 may include a buffer space 316 which may be a fixed or virtual set of memory locations that buffers or otherwise temporarily stores audiovisual data. In practice, the video data may be stored separate from the audio data, but it would be possible to intermix these data types depending upon the particular application and coding techniques utilized for the audio and visual data.

The audio visual data stored in the buffer space 316 includes one or more start addresses 317 which indicate the beginning memory address at which the audio and/or video data (A/V) is stored. If the A/V data is separately stored, then a plurality of stored addresses will be necessary. Furthermore, if there are more than one set of, or a block of data within the buffer space 316, then the start addresses 317 will individually point to each block of data.

The memory device 315 also includes a status word space 318. This status word space includes fixed or virtual addresses at which status words may be stored. An example of a status word that may be stored in the status word space 318 is a status word summarizing the status of a peripheral device. For example, the status word that may be stored within the status word space 318 may include the status of the host processor 310 or transport processor 330. The status word space 318 may also include pointers 319 that point to the start addresses 317 within the buffer space 316.

As further shown in FIG. 4, the SDRAM 315 may connect to the bus 305 via an interface 314. The dash lines indicate that the interface 314 is optional and may or may not be included depending upon the interface requirements of the particular memory device 315 and/or bus 305.

Figure 5:
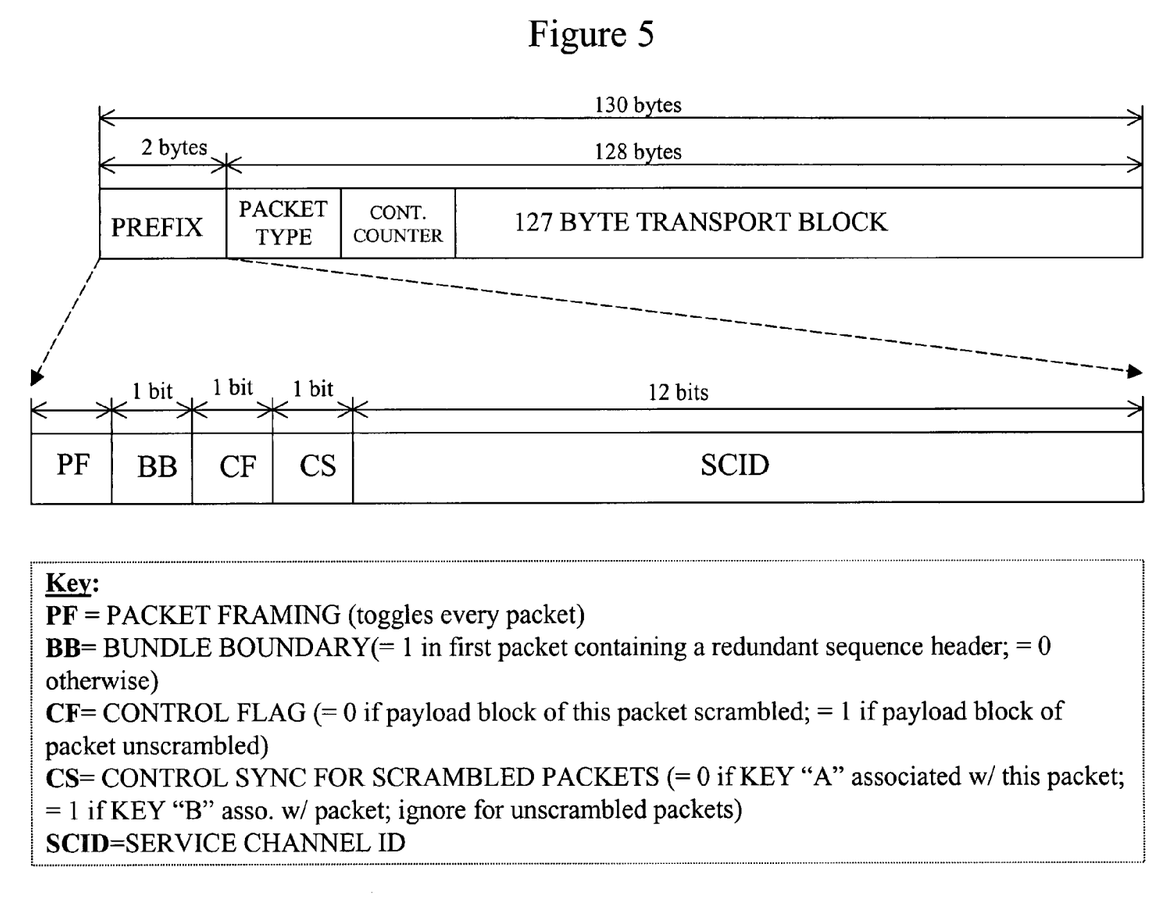
FIG. 5 is a diagram illustrating a preferred data format for packetized data received and transmitted in accordance with an exemplary embodiment of the invention.

FIG. 5 is a diagram illustrating an exemplary data packet that is transmitted via the system of the present invention. All information may be transmitted in this format, including video, audio, program guide, conditional access and other data.

As shown, each data packet is 130 bytes long (a byte is made up of 8 bits), but seventeen additional bytes (not shown) are used for error correction and/or other functions. The first two bytes of information contain the service channel ID (SCID) and flags. The SCID is a unique 12-bit number that uniquely identifies the particular data stream to which a data packet belongs. The flags may be made up of four bits, including bits to indicate whether or not the packet is encrypted and which key (A or B) to use for decryption.

The next 128 bytes make up the "payload block". The payload block includes the packet type, continuity counter and transport block. As seen in FIG. 5, the third byte of information from the left may be made up of a four-bit packet type indicator and a four-bit continuity counter. The packet type identifies the packet as having one of four formats. When combined with the SCID, the packet type determines how the packet is to be used. In general, the continuity counter increments once for each packet received with the same SCID value. The next 127 bytes of information is the "transport block", includes the data which is the actual usable information sent from the program provider. Such packets may have less than 127 bytes of useful data.

Figure 6:
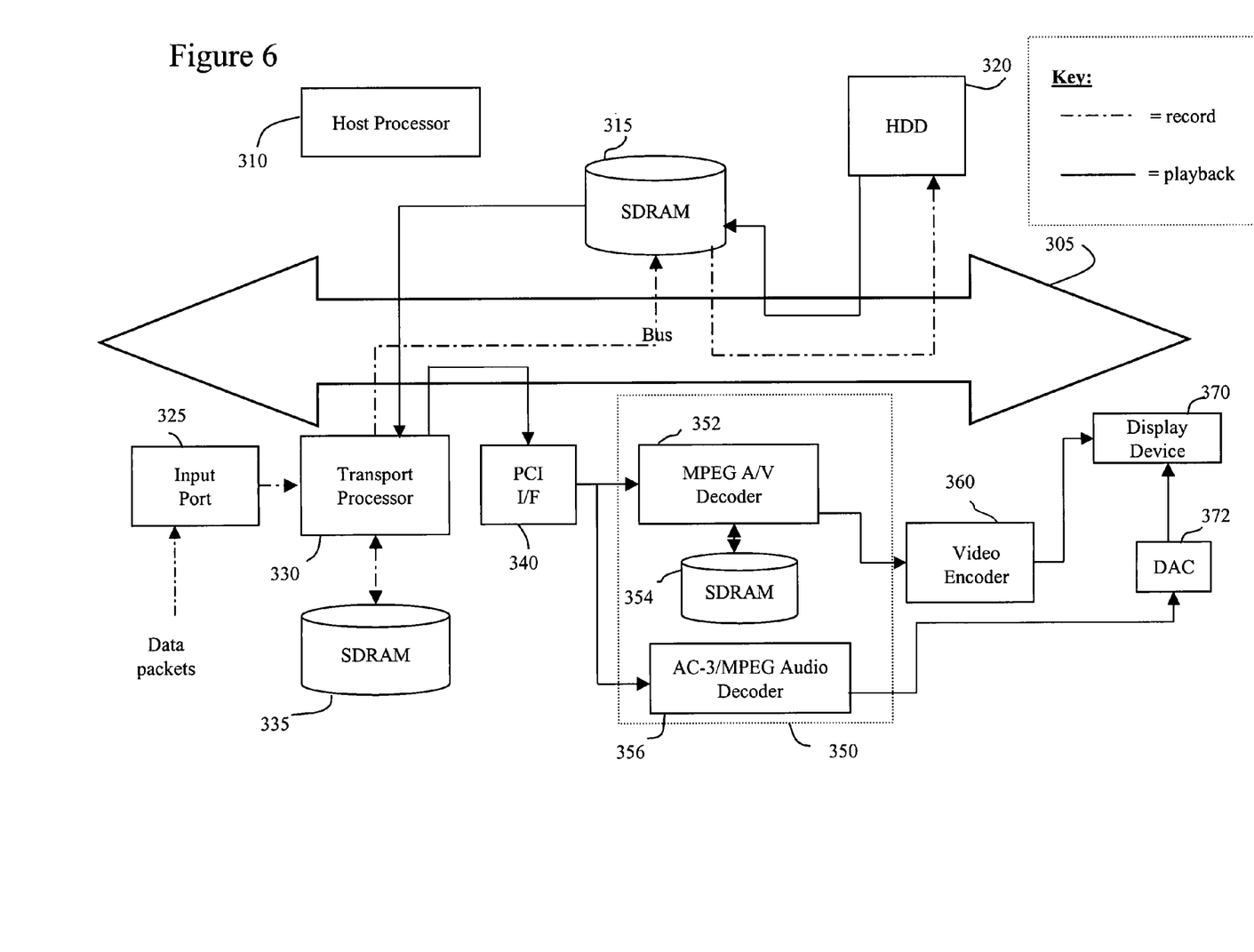
FIG. 6 is a flow diagram showing data flow for recording or background caching of encrypted programming such as pay-per-view (PPV) events for later playback in accordance with an exemplary embodiment of the invention.

The operation of the invention will now be described in accordance with FIGS. 6 and 7. FIG. 6 shows the data flow among the various components of the STB 300. Some of the connections between components, and associated reference numerals from FIG. 3 may have been eliminated in FIG. 6 in order to highlight the data flow which is shown using dashed lines (see Key) in FIG. 6.

The operation of recording or background caching of encrypted data in STB 300 will now be described. When the STB 300 is in a power-down mode, namely a viewer is not watching programming on the display device 370, the host processor 310 searches a program guide therein to find an upcoming pay-per-view (PPV) event to ultimately record on HDD 320. When the PPV event begins, the STB 300 tunes to the appropriate transponder and begins receiving the A/V data, system time and conditional access packets associated with the PPV event (hereinafter collectively termed "programming data" for convenience; this is the packet data shown in FIG. 5).

As shown in FIG. 6, the data packets received by input port 325 are time-stamped at time of reception and fed to the transport processor 330. At this point, and if desired, the programming data (which is received as compressed and encrypted data as explained above) may also be subjected to an additional layer of copy protection provided by transport processor 330.

The transport processor 330 then transfers the received programming data to SDRAM 315. Digital recording (background caching) is accomplished by the host processor 310, which transfers the programming data buffered by SDRAM 315 to the HDD 320. In other words, the SDRAM 315 serves as a buffer which buffers data sent by transport processor 330. This allows the host processor 310 to control the recording onto the HDD 320 when host processor 310 time is available. When a sufficient amount of programming data has been accumulated in the SDRAM 315, the host processor 310 transfers the data from the SDRAM 315 to the HDD 320 for recording therein.

When the selected PPV recording is complete, the host processor 310 then searches for another, not previously recorded PPV event to record. The above procedure is then repeated. Over the course of a week or so, all PPV events on the satellite system can be recorded to HDD 320 in this manner. Approximately 75 programs (105 minutes at 3 Mbps) can be recorded in 175 Gbytes of disk space. Thirty (30) Gbytes of disk space will hold about 13 PPV programs.

Figure 7:
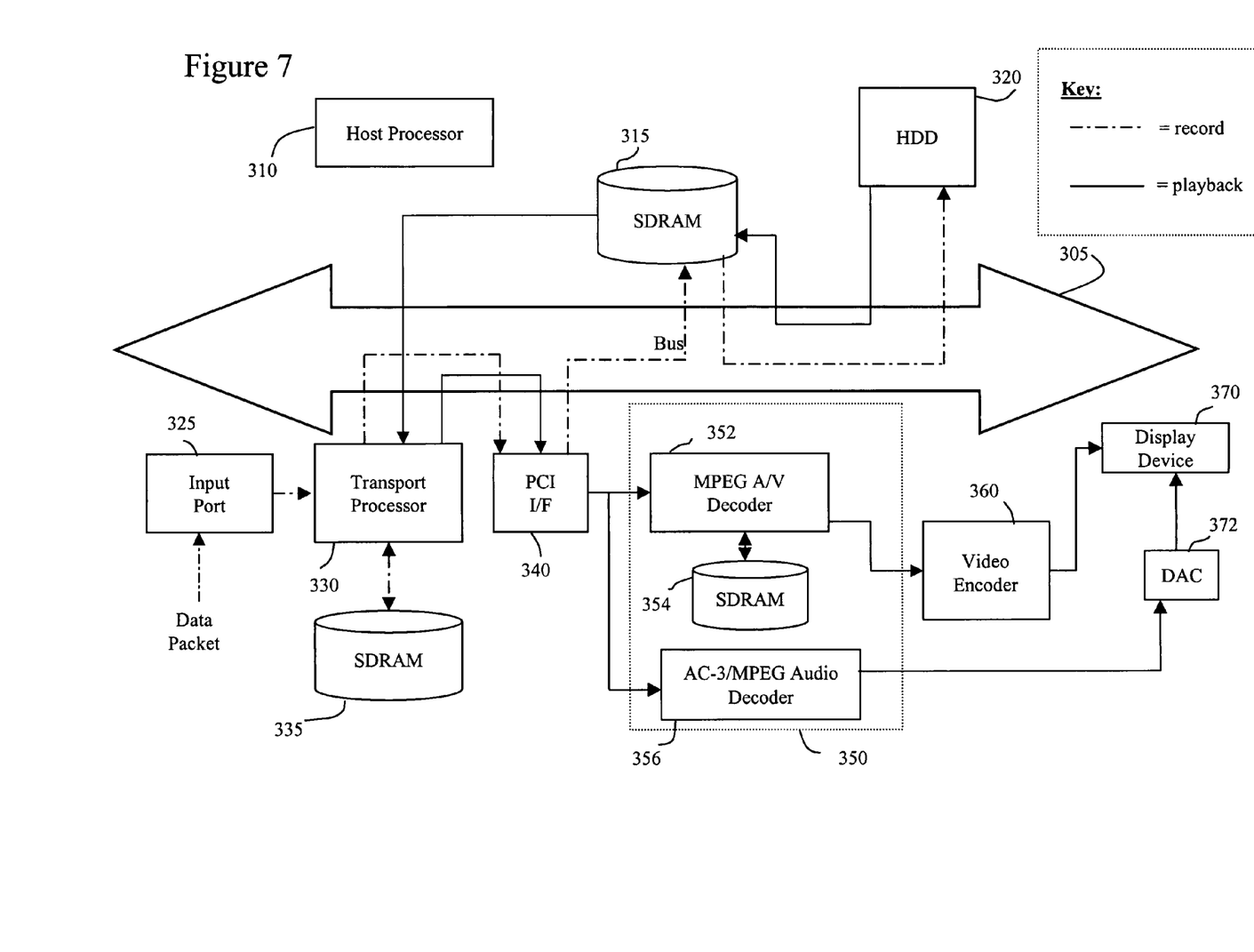
FIG. 7 illustrates an alternative recording path in accordance with the invention.

FIG. 7 illustrates an alternative signal path for recording. Audiovisual data is fed from the input port 325 to the transport processor 330. The transport processor 330 then transfers the received audiovisual data to the PCI I/F 340, as indicated by the dashed data flow line. The PCI I/F 340 receives audiovisual data from the transport processor 330 via bus 305, and sends this data to host processor 310, more particularly to SDRAM 315. Digital recording is accomplished similarly, with SDRAM 315 serving as a buffer that buffers data sent by the PCI I/F 340. This allows the host processor 310 to control the recording onto the HDD 320 when processor time is available. When a sufficient amount of A/V data has been accumulated in the SDRAM 315, the host processor 310 transfers the data from the SDRAM 315 to the HDD 320 for recording therein. To record data, the host processor 310 may also inform the PCI I/F 340 of available start addresses in the SDRAM buffer space 315 to which data may be buffered for eventual recording in HDD 320.

The operation of playing back the cached/recorded encrypted programming data in STB 300 is now described. Referring again to FIG. 6, when the viewer turns the STB 300 back on, the viewer is given the option to playback any of the previously recorded PPV events. Preferably, this may be done by using remote control (not shown) to access a menu on display device 370. If the viewer selects a PPV event, the corresponding audio, video, system time and conditional access packets (i.e., the selected programming data) are retrieved from HDD 320.

In particular, when the user selects the playback option, the selected programming data recorded on HDD 320 is sent via bus 305 to a queue in SDRAM 315. Next, the buffered data is sent from SDRAM 315 via bus 305 to transport processor 330, back to bus 305 and then to PCI I/F 340, which in turn sends the selected programming data to decoder 350. More specifically, the video portion of the bitstream is sent to MPEG A/V decoder 352, with the audio portion being sent to AC-3/MPEG audio decoder 356. Further, any conditional access is removed (decrypted) by transport processor 330 before the data is then sent to decoder 350. The conditional access packets are used to decrypt the audio and video data in transport processor 330, with the decrypted data being sent to decoder 350 via PCI I/F 340.

Transport processor 330 and decoder 350 (in particular MPEG A/V decoder 352), use the recorded time stamps to recreate the original transmission timing of the data. Additionally, MPEG A/V decoder 352 may be provided with an SDRAM 354 in order to more efficiently decode the MPEG bitstream (i.e. now-decrypted but still encoded video portion of the programming data) received from PCI I/F 340. SDRAM 354 is similar to SDRAM 315 discussed above in its construction. SDRAM 354 temporarily holds the encoded video bitstream data, and also provides the three frame buffers required for MPEG decoding, as is known in the art. Thereafter, the decoded programming data (A/V data) is output to NTSC encoder 360 for conversion to an analog format, so that it may be displayed on display device 370. From this point on, the playback data looks, for all intents and purposes, identical to the original PPV broadcast.

As outlined above, the present invention provides the viewer with much more flexibility regarding a PPV event. In particular, the user need not decide in a relatively short period of time whether to view a PPV event, the user need not be available when the PPV event is being broadcast, the user need not wait until the next half-hour boundary, and the user need not watch the PPV event in real time. In fact, the present invention may be utilized to record an entire month or more of PPV programming, which can be viewed at the user's convenience. The PPV events are not billed to the viewer until viewing occurs.

The present invention has been described primarily in terms of a storage medium such as HDD 320 being an internal component within the STB 300 equipped with DVR. However, the present invention is not limited to this application; it is equally applicable to an STB that records programming data to, and later accesses the data for playback from, an external storage medium (i.e., an external hard disc drive). An exemplary embodiment of such an STB is now described.

Figure 8:
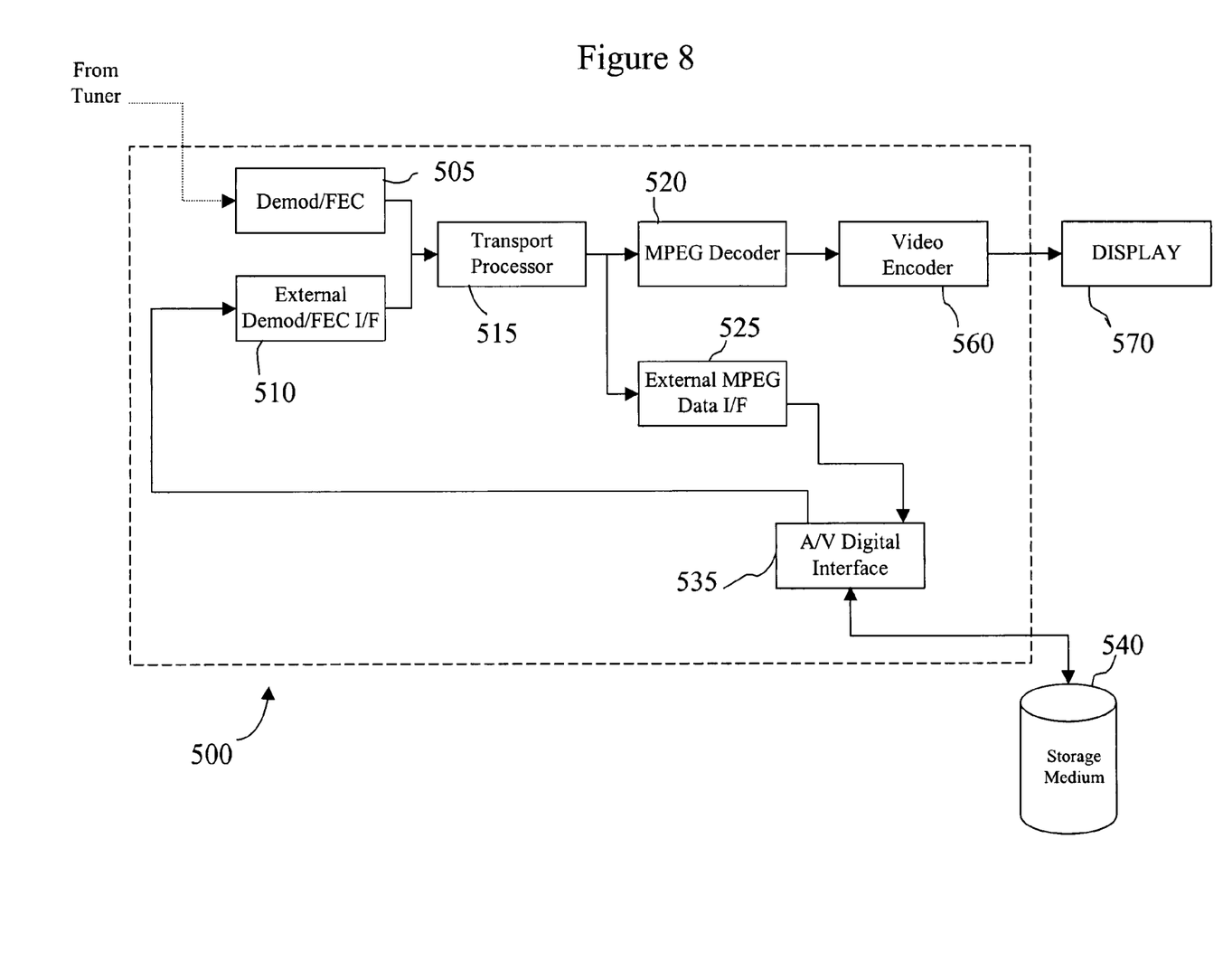
FIG. 8 is a block diagram of an another exemplary set-top box in accordance with the invention.

FIG. 8 is a block diagram of an another exemplary STB 500 in accordance with the invention. A satellite dish antenna (such as ODU 250 in FIG. 1) transfers the received satellite signal to a conventional LNB down converter circuit (not shown) which then passes the signal to a satellite tuner that transmits the signal to the STB 500. The satellite tuner may also be integrated within the STB 500.

As illustrated in FIG. 8, STB 500 may include a demodulator/forward error correction (FEC) decoder 505, an external demodulator/FEC interface 510, a transport processor 515, an MPEG decoder 520, an external MPEG data interface 525, an A/V digital interface 535, and a video encoder 560. The external demodulator/FEC interface 510 and the external MPEG data interface 525 exchange data with the A/V digital interface 535 and an external storage medium 540. A decoded output stream from the MPEG decoder 520 is converted to analog in video encoder 560 and fed to a display 570. In one embodiment, the demodulator/FEC decoder 505, the external demodulator/FEC interface 510, the transport processor 515, the MPEG decoder 520, external MPEG data interface 525, A/V digital interface 535 and video encoder 560 may be implemented on a single chip.

The operation is now described. When the STB 500 is in a power-down mode, STB 500 searches a program guide to find an upcoming pay-per-view (PPV) event. When the PPV event begins, the STB 500 tunes to the appropriate transponder and begins receiving the A/V, system time and conditional access packets associated with the PPV event.

Similar to the STB described earlier, all of incoming programming data (the data described in FIG. 5 for example) is time-stamped at the time of reception and passed to the external MPEG data interface 525. The programming data is not decrypted at this time, but is passed from the STB 500 to the A/V digital interface 535. Preferably, the A/V digital interface 535 is configured in accordance with an industry standard. The compressed, encrypted programming data is then passed to an integrated circuit that is part of the A/V digital interface 535 and placed inside a wrapper. The data, if desired, may also be subjected to an additional layer of copy protection provided by A/V digital interface 535. Thereafter, the data is sent to external storage medium 540 for storage. Alternatively, a 1394 storage scheme may be used, including a 1394 A/V digital interface as the A/V digital interface 535 and a 1394 hard drive as the external storage medium 540.

When the selected PPV recording is complete, the STB 500 then searches for another, not previously recorded PPV event, to record. Similar to that described with reference to the STB, the above procedure is then repeated. Over the course of a week or so, all PPV events on the satellite system can be recorded to the storage medium 540 in this manner.

When the viewer turns STB 500 back on, the viewer is given the option to playback any of the previously recorded PPV events. If the viewer selects one, the appropriate audio, video, system time and conditional access packets are retrieved from the storage medium 540 via the A/V digital interface 535. Any conditional access that was applied at the A/V digital interface 535 is removed (decrypted) and the data is then sent back to the external demodulator/FEC interface 510, which uses the recorded time stamps to recreate the original transmission timing of the data.

In one embodiment, the external demodulator/FEC interface 510 may be used to move the data back into the single system chip, for example. From this point on, the playback data looks essentially identical to the original PPV broadcast. The conditional access packets are used to decrypt the audio and video data, which is then sent to the MPEG decoder 520 and eventually to the display 570 via video encoder 560.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An apparatus for performing background caching of encrypted programming for later playback, comprising:
   a memory operatively connected to a bus for storing received, encrypted digital data packets of at least one pay-per-view (PPV) event;
   a processor for decrypting the data packets when they are transferred by the memory via the bus; and
   a decoder for decoding the decrypted data packets for display on a display device,
   wherein the apparatus is adapted to search a program guide to find upcoming PPV events, and, to select at least one PPV event for recording without instruction from a user, and when the PPV event begins, the apparatus tunes to an appropriate transponder to begin receiving the encrypted digital data packets and caches the data packets of the selected at least one PPV event when in a power-down mode, and plays back a recorded PPV event in a power-up mode upon selection by the user.

2. The apparatus according to claim 1, further comprising a recording device for digitally recording the encrypted digital data packets, and for transmitting the digitally recorded data packets to the memory.

3. The apparatus according to claim 2, wherein the recording device includes at least one mass storage device.

4. The apparatus according to claim 3, wherein the mass storage device is at least one of a hard disc drive, magnetic storage device or optical storage medium.

5. The apparatus according to claim 2, wherein the processor is a transport processor operatively connected to the bus and to an input port for receiving the encrypted digital data packets from the input port.

6. The apparatus according to claim 5, further comprising:
a host processor operatively connected to the bus and the memory for performing graphics-user interface and browser functions; and
an interface for receiving the encrypted digital data packets from the transport processor, and for transferring the received encrypted digital data packets simultaneously to the memory via the bus, and to the decoder,
the memory further including a buffer space for temporarily storing the encrypted digital data packets received from the interface,
the host processor directing the memory to transfer the encrypted digital data packets to be digitally recorded by the recording device, and
the interface adapted to receive the digitally recorded data packets from the recording device via the memory and the bus.

7. The apparatus according to claim 6, the interface being further adapted to transfer the digitally recorded data packets to the decoder.

8. The apparatus according to claim 6, wherein the host processor searches a the program guide to find the upcoming PPV events.

9. The apparatus according to claim 8, wherein the digital data packets include packetized audiovisual data, system time data and conditional access data.

10. The apparatus according to claim 5, wherein the transport processor provides an additional layer of conditional access for the encrypted digital data packets.

11. The apparatus according to claim 1, wherein the data packets are time-stamped upon reception.

12. The apparatus according to claim 5,
wherein the data packets are time-stamped upon reception, and
wherein the decoder and transport processor utilize the recorded time stamps to recreate the original transmission timing of the encrypted digital data packets, only when the user selects a recorded PPV event for playback.

13. The apparatus according to claim 1,
wherein the memory stores encrypted digital data of a plurality of PPV events in repetition while the apparatus is in the power-down mode, and
wherein the user only pays for those recorded PPV events that are selected for playback in the power-up mode.

14. The apparatus according to claim 2, wherein the recording device is an external storage medium.

15. The apparatus according to claim 5, wherein the transport processor decrypts the encrypted digital data packets of the user-selected PPV event, and sends the decrypted data packets to the decoder via the interface.

16. The apparatus according to claim 15, wherein the decoder includes an MPEG A/V decoder for decoding the video portion of the decrypted digital data packets, and an AC-3/MPEG audio decoder for decoding the audio portion of the decrypted digital data packets.

17. The apparatus of claim 16, further comprising a video encoder that converts the received video portion of the decrypted digital data packets to analog for display.

18. The apparatus of claim 1, wherein the apparatus is configured as a set-top box (STB) equipped with a digital video recorder.

19. A method for background caching encrypted programming for later playback in a digital video recording (DVR) system, comprising:
storing received, encrypted digital data packets of at least one pay-per-view (PPV) event in a memory;
time-stamping the received data packets upon reception;
decrypting the data packets when they are transferred by the memory via a bus;
decoding the decrypted data packets for display on a display device;
searching a program guide to find upcoming PPV events;
selecting at least one PPV event for recording without user instruction;
tuning the DVR system to an appropriate transponder when the selected PPV event begins, to begin receiving the encrypted digital data packets; and
caching its corresponding data packets, when the DVR system is in a power-down mode; and
wherein a selected PPV event is played back when the DVR system is in a power-up mode, upon selection by the user.

20. The method according to claim 19, wherein the step of storing is repeated for a plurality of PPV events when the DVR system is in the power-down mode.

21. The method according to claim 20, wherein the user only pays for those cached PPV events that are selected for playback in the power-up mode.

22. The method according to claim 19, wherein the searching is performed by a host processor in the DVR system.

23. The method according to claim 19, further comprising decrypting the encrypted digital data packets of the user-selected PPV event, wherein the decryption is performed in a transport processor operatively connected to the memory via the bus.

24. The method according to claim 19, wherein the step of decoding includes utilizing the recorded time stamps to recreate the original transmission timing of the encrypted digital data packets, only when the user selects a recorded PPV event for playback.

25. A set-top box (STB) for performing background caching of encrypted programming for later playback, comprising:
searching means for searching a program guide to find upcoming pay-per-view (PPV) events received as encrypted data packets;
storing means for caching the received encrypted data packets for later playback; and
retrieval means for retrieving the data packets for display, wherein the searching means searches a program guide for the at least one PPV event without user instruction and the storing means caches the data packets of the at least one PPV event received from the appropriately tuned transponder when the STB is in a power-down mode, and plays back a recorded PPV event when the STB is in a power-up mode.

26. The STB of claim 25, wherein the searching means and the storing means repeat searching and recording for a plurality of PPV events, the recorded plurality of PPV events being stored on an external storage medium for later playback.

27. The STB of claim 25,
wherein the encrypted digital data packets are time-stamped upon reception, and
wherein the retrieval means decrypts the encrypted digital data packets, uses the recorded time stamps to recreate the original transmission timing data of the data packets, and decodes the decrypted digital data packets for display on a display device.

28. The STB of claim 25, wherein a user only pays for those cached PPV events that are selected for playback in the power-up mode.

* * * * *